(12) United States Patent
Mantri (10) Patent No.: US 8,861,650 B2
(45) Date of Patent: Oct. 14, 2014

(54) USING ACE SYMBOLS WITH PRECODING TO SAVE MEMORY AND COMPLEXITY IN RECEIVER

(71) Applicant: Metanoia Communications Inc., Hsinchu (TW)

(72) Inventor: Ravi Mantri, Portland, OR (US)

(73) Assignee: Metanoia Communications Inc. (TW)

( * ) Notice: Subject to any disclaimer, the term of this patent is extended or adjusted under 35 U.S.C. 154(b) by 0 days.

(21) Appl. No.: 13/691,835

(22) Filed: Dec. 2, 2012

(65) Prior Publication Data

US 2013/0142228 A1    Jun. 6, 2013

Related U.S. Application Data

(60) Provisional application No. 61/566,589, filed on Dec. 2, 2011.

(51) Int. Cl.
| | |
|---|---|
| *H04L 27/06* | (2006.01) |
| *H04B 7/04* | (2006.01) |
| *H04B 3/32* | (2006.01) |
| *H04L 25/02* | (2006.01) |
| *H04L 27/26* | (2006.01) |
| *H04L 1/00* | (2006.01) |
| *H04L 5/00* | (2006.01) |
| *H04L 25/03* | (2006.01) |

(52) U.S. Cl.
CPC ............... *H04B 7/0413* (2013.01); *H04B 3/32* (2013.01); *H04L 5/0023* (2013.01); *H04L 25/0226* (2013.01); *H04L 25/03891* (2013.01); *H04L 27/2613* (2013.01); *H04L 1/0047* (2013.01)
USPC .......................................... 375/340; 375/316

(58) Field of Classification Search
CPC ............................... H04L 1/0047; H04B 3/32
USPC ......................................................... 375/340
See application file for complete search history.

(56) References Cited

U.S. PATENT DOCUMENTS

| | | | | |
|---|---|---|---|---|
| 2012/0120945 | A1* | 5/2012 | Alexander et al. | 370/350 |
| 2013/0044828 | A1* | 2/2013 | Jiang et al. | 375/257 |

* cited by examiner

*Primary Examiner* — Erin File
(74) *Attorney, Agent, or Firm* — Han IP Corporation; Andy M. Han (57) ABSTRACT

Described herein are a technique, method, device and system related to reducing memory requirements and complexity in receivers. According to the present disclosure, the capability to request precoded ACE symbols is added to receivers in a mode under the g.hn MIMO standards that uses precoding to enhance the capacity of links. Using precoded ACE symbols, memory requirements for the receiver can be reduced as it is not necessary for the receiver to save the precoder coefficients. Additionally, the frequency of updates required for the precoding coefficients can be reduced by adapting the MIMO decoder using the precoded ACE symbols as reference symbols.

20 Claims, 6 Drawing Sheets

USING ACE SYMBOLS WITH PRECODING TO SAVE MEMORY AND COMPLEXITY IN RECEIVER

CROSS-REFERENCE TO RELATED APPLICATION

This application claims the priority benefit of U.S. Provisional Patent Application No. 61/566,589, filed on Dec. 2, 2011, which is hereby incorporated by reference in its entirety.

BACKGROUND

1. Technical Field

The present disclosure generally relates to the field of digital communication and, more particularly, to home networking with multiple-input and multiple-output capabilities.

2. Description of the Related Art

The g.hn standards (ITU-T G.9960, G.9961 and G.9963) use additional channel estimation (ACE) symbols for channel estimation. These symbols are typically modulated with uniform loading of two bits per sub-carrier using a pseudo-random sequence of bits that is known to the receiver. The current g.hn multiple-input multiple-output (MIMO) standard (G.9963), which is under development at the time of preparation of the present disclosure, supports a mode which uses precoding to enhance the capacity of links by reducing or eliminating cross-talk between the two transmission paths. In this mode, the preamble, header and ACE symbols are transmitted without precoding while the payload is transmitted with precoding. This ensures this mode can be used in a shared transmit opportunity (STXOP) where multiple nodes assigned to the STXOP that need to track the grid of time slots (TSs) are able to decode the header for virtual carrier sensing (i.e., keeping track of the grid simply by decoding the PHY frame header without having to decode complete frames).

SUMMARY

The present disclosure describes a technique, method, device and system that add a mechanism for the receiver to request one or more ACE symbols with precoding applied by the transmitter. This would allow the receiver to generate the MIMO decoder based on the symbols which already have precoding applied and then use those for the payload symbols. This avoids the need for the receiver to maintain precoding coefficients and also avoids the operation of transforming the MIMO decoder generated using signals without precoding, so that it can be applied to the payload symbols which are precoded. This can lead to substantial savings in memory and computational complexity. For example, in case of g.hn powerline 100 Mhz bandplan, since there are up to 4096 sub-carriers and each precoding coefficient could be up to 16-bits, the savings in memory would be about 64 kbits for each link that supports precoding. Additionally, since there is no need to save the precoding coefficients on the receive side, the receiver can support multiple links with precoding with minimal memory requirement, leading to an improved throughput on multiple links and more efficient use of the time on the shared medium. Notably, the STXOP mechanism can still function as before, since in at least some embodiments of the proposed mechanism the precoding is not applied to preamble and PHY frame header, and it is applied to at least one ACE symbol and payload symbols. Of course, those of ordinary skill in the art would appreciate that, although the present disclosure is described based on ACE symbols as defined in G.hn, the techniques disclosed herein are applicable for any additional symbols (in addition to payload symbols) that use modulation of sub-carriers using sequence of bits and bit-loading known to the receiver.

According to one aspect, a method may comprise: receiving at least one ACE symbol; generating a decoder using information from the at least one ACE symbol; receiving one or more precoded payload symbols; and decoding the one or more precoded payload symbols using the decoder.

In at least some embodiments, the decoder may be a MIMO decoder.

In at least some embodiments, the method may further comprise transmitting a request for one or more precoded ACE symbols prior to receiving the at least one ACE symbol. The request may be a one-time request applicable to future frames until a new request is transmitted. Alternatively, the request may be applicable to an immediate next frame and not to other future frames.

In at least some embodiments, the method may further comprise: receiving a frame, the frame comprising a preamble, a header, and one or more ACE symbols that are not precoded.

In at least some embodiments, the method may further comprise: receiving a frame, the frame comprising a precoded preamble, a precoded header, and one or more precoded ACE symbols; and decoding the precoded preamble, the precoded header, and the one or more precoded ACE symbols.

In at least some embodiments, the method may further comprise: receiving a frame, the frame comprising a preamble that is not precoded, the frame further comprising a precoded header and one or more precoded ACE symbols; and decoding the precoded header and the one or more precoded ACE symbols. In at least some embodiments, the frame may further comprise one or more other ACE symbols that are not precoded.

In at least some embodiments, the method may further comprise: receiving a frame, the frame comprising a preamble and a header that are not precoded, the frame further comprising one or more precoded ACE symbols; and decoding the one or more precoded ACE symbols. In at least some embodiments, the frame may further comprise one or more other ACE symbols that are not precoded.

According to another aspect, a method may comprise: receiving a first frame from a first communication device that transmits a plurality of frames at least one of which comprising one or more precoded symbols, the frame comprising at least a preamble, a header, and one or more ACE symbols; and generating a decoder using information from the first frame or a previous frame received before the first frame.

In at least some embodiments, the preamble, header, and one or more ACE symbols of the first frame may not be precoded.

In at least some embodiments, the generating the decoder may comprise generating an adaptive MIMO decoder using the preamble, the header, and the one or more ACE symbols of the first frame.

In at least some embodiments, the generating the decoder may comprise generating a fixed MIMO decoder using one or more ACE symbols of the previous frame.

In at least some embodiments, the method may further comprise: receiving one or more additional frames each of which comprising one or more ACE symbols that are generated based on a reference signal; and tracking changes in a channel, through which the one or more additional frames are received, by updating the decoder.

In at least some embodiments, the one or more ACE symbols of the first frame may be precoded.

In at least some embodiments, the generating the decoder may comprise generating an adaptive MIMO decoder using the preamble, the header, and the one or more ACE symbols of the first frame.

In at least some embodiments, the generating the decoder may comprise generating a fixed MIMO decoder using the one or more ACE symbols of the previous frame or frames. Additionally, the method may further comprise: receiving one or more additional frames each of which comprising one or more ACE symbols that are generated based on a reference signal; and tracking changes in a channel, through which the one or more additional frames are received, by updating the MIMO decoder.

According to another aspect, a processor may comprise a first module, a second module, a third module, and a fourth module. The first module may be configured to transmit a request for one or more ACE symbols. The second module may be configured to receive at least one ACE symbol and one or more precoded payload symbols. The third module may be configured to generate a decoder using information from the at least one ACE symbol, and store the decoder in a dedicated or otherwise allocated memory space of a memory. The fourth module may be configured to decode the one or more precoded payload symbols using the decoder.

In at least some embodiments, the request may be a one-time request applicable to future frames until a new request is transmitted.

In at least some embodiments, the request may be applicable to an immediate next frame and not to other future frames.

In at least some embodiments, the decoder may be a MIMO decoder.

In at least some embodiments, the second module may be further configured to receive a frame. The frame may comprise a preamble, a header, and one or more ACE symbols that are not precoded.

In at least some embodiments, the second module may be further configured to receive a frame. The frame may comprise a precoded preamble, a precoded header, and one or more precoded ACE symbols. Additionally, the fourth module may be further configured to decode the precoded preamble, the precoded header, and the one or more precoded ACE symbols.

In at least some embodiments, the second module may be further configured to receive a frame. The frame may comprise a preamble that is not precoded. The frame may further comprise a precoded header and one or more precoded ACE symbols. Additionally, the fourth module may be further configured to decode the precoded header and the one or more precoded ACE symbols.

In at least some embodiments, the second module may be further configured to receive a frame. The frame may comprise a preamble and a header that are not precoded. The frame may further comprise one or more precoded ACE symbols. Additionally, the fourth module may be further configured to decode the one or more precoded ACE symbols. In at least some embodiments, the frame may further comprise one or more other ACE symbols that are not precoded.

According to another aspect, the second module may be configured to receive a first frame from a first communication device that transmits a plurality of frames at least one of which comprising one or more precoded symbols, where the frame may comprise at least a preamble, a header, and one or more ACE symbols. The third module may be configured to generate a decoder using information from the first frame or a previous frame received before the first frame. The third module may be configured to store the decoder in the dedicated or otherwise allocated memory space of the memory.

In at least some embodiments, the preamble, header, and one or more ACE symbols of the first frame may not be precoded.

In at least some embodiments, in generating the decoder, the third module may be configured to generate an adaptive MIMO decoder using the preamble, the header, and the one or more ACE symbols of the first frame.

In at least some embodiments, in generating the decoder, the third module may be configured to generate a fixed MIMO decoder using one or more ACE symbols of the previous frame.

In at least some embodiments, the second module may be further configured to receive one or more additional frames each of which comprising one or more ACE symbols that are generated based on a reference signal. Additionally, the fourth module may be further configured to track changes in a channel, through which the one or more additional frames are received, by updating the decoder.

In at least some embodiments, the one or more ACE symbols of the first frame may be precoded.

In at least some embodiments, in generating the decoder, the third module may be configured to generate an adaptive MIMO decoder using the preamble, the header, and the one or more ACE symbols of the first frame.

In at least some embodiments, in generating the decoder, the third module may be configured to generate a fixed MIMO decoder using the one or more ACE symbols of the previous frame or frames. Additionally, the second module may be further configured to receive one or more additional frames each of which comprising one or more ACE symbols that are generated based on a reference signal. Further, the fourth module may be further configured to track changes in a channel, through which the one or more additional frames are received, by updating the MIMO decoder.

According to one aspect, a computer-readable medium having a set of computer-executable instructions stored thereon that, when executed by one or more processors, may cause the one or more processors to perform operations. The operations may comprise: transmitting a request for one or more precoded ACE symbols; receiving at least one precoded ACE symbol in response to transmitting the request; generating a decoder using the at least one precoded ACE symbol; receiving one or more precoded payload symbols; and decoding the one or more precoded payload symbols using the decoder.

In at least some embodiments, the request may be a one-time request applicable to future frames until a new request is transmitted.

In at least some embodiments, the request may be applicable to an immediate next frame and not to other future frames.

In at least some embodiments, the decoder may be a MIMO decoder.

In at least some embodiments, the method may further comprise: receiving a frame, the frame comprising a preamble, a header, and one or more ACE symbols that are not precoded.

In at least some embodiments, the method may further comprise: receiving a frame, the frame comprising a precoded preamble, a precoded header, and one or more precoded ACE symbols; and decoding the precoded preamble, the precoded header, and the one or more precoded ACE symbols.

In at least some embodiments, the method may further comprise: receiving a frame, the frame comprising a preamble that is not precoded, the frame further comprising a precoded header and one or more precoded ACE symbols; and decoding the precoded header and the one or more precoded ACE symbols.

In at least some embodiments, the method may further comprise: receiving a frame, the frame comprising a preamble and a header that are not precoded, the frame further comprising one or more precoded ACE symbols; and decoding the one or more precoded ACE symbols. In at least some embodiments, the frame may further comprise one or more other ACE symbols that are not precoded.

According to another aspect, a computer-readable medium having a set of computer-executable instructions stored thereon that, when executed by one or more processors, may cause the one or more processors to perform operations. The operations may comprise: receiving a first frame from a first communication device that transmits a plurality of frames at least one of which comprising one or more precoded symbols, the frame comprising at least a preamble, a header, and one or more ACE symbols; and generating a decoder using information from the first frame or a previous frame received before the first frame. The previous frame may comprise one or more precoded ACE symbols.

In at least some embodiments, the preamble, header, and one or more ACE symbols of the first frame may not be precoded.

In at least some embodiments, the generating the decoder may comprise generating an adaptive MIMO decoder using the preamble, header, and one or more ACE symbols of the first frame.

In at least some embodiments, the generating the decoder may comprise generating a fixed MIMO decoder using the one or more precoded ACE symbols of the previous frame.

In at least some embodiments, the method may further comprise: receiving one or more additional frames each of which comprising one or more precoded ACE symbols that are generated based on a reference signal; and tracking changes in a channel, through which the one or more additional frames are received, by updating the decoder.

In at least some embodiments, the one or more ACE symbols of the first frame may be precoded.

In at least some embodiments, the generating the decoder may comprise generating an adaptive MIMO decoder using the preamble, header, and one or more ACE symbols of the first frame.

In at least some embodiments, the generating the decoder may comprise generating a fixed MIMO decoder using the one or more precoded ACE symbols of the previous frame. Additionally, the method may further comprise: receiving one or more additional frames each of which comprising one or more precoded ACE symbols that are generated based on a reference signal; and tracking changes in a channel, through which the one or more additional frames are received, by updating the decoder.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure.

DETAILED DESCRIPTION OF PREFERRED EMBODIMENTS OVERVIEW

A MIMO system consists of multiple transmitters (t) and multiple receivers (r). The transmitter sends a vector of transmit signals $(x_1, x_2, \ldots, x_t)$ over the t transmitters. At the receiver end, r receivers can receive a vector of receive signals $(y_1, y_2, \ldots, y_r)$. The MIMO channel is characterized by an r×t channel transfer matrix H with entries $H_{i,j}$ which stand for the transfer response from transmitter j to receiver i.

In OFDM-MIMO systems this model can be used to characterize each one of the individual subcarriers (tones) such that MIMO channel model applies per sub-carrier. Therefore, the following analysis is performed on a per subcarrier basis for the OFDM signal. Thus all of the equations below are considered as functions of the frequency (i.e., subcarrier index), but for simplicity of notation this dependence is omitted without any loss of generality.

The following relation results from a transmit vector $x=[x_1, x_2, \ldots, x_t]^T$, a receive vector $y=[y_1, y_2, \ldots, y_r]^T$, and noise vector $n=[n_1, n_2, \ldots, n_r]^T$:

$$y = Hx + n, \tag{1}$$

$$y_1 = h_{11} \cdot x_1 + h_{12} \cdot x_2 + \ldots + h_{1t} \cdot x_t + n_1 \tag{2}$$

$$y_2 = h_{21} \cdot x_1 + h_{22} \cdot x_2 + \ldots + h_{2t} \cdot x_t + n_2$$

$$\vdots$$

$$y_r = h_{r1} \cdot x_1 + h_{r2} \cdot x_2 + \ldots + h_{rt} \cdot x_t + n_r$$

The cross-correlation matrix of the noise components is denoted by $\Lambda$ as follows:

$$\Lambda = E\{n \cdot n^H\}. \tag{3}$$

In order to approach the channel capacity and enhance the system robustness, it is desirable to adapt the transmitted signal to the channel conditions. The receiver estimates the channel response matrix, and may convey the channel state information to the transmitter via a special control channel in the reverse direction. This scheme, which is also known as closed-loop MIMO, enables the transmitter to respond to changing channel conditions. The channel state information is communicated periodically or at the discretion of the receiver whenever the receiver senses change in the channel state information. Alternatively, a scheme in which the channel state information is not explicitly communicated to the transmitter is known as open-loop MIMO.

One of the traditional transmission schemes that approaches capacity is based on closed-loop MIMO. In this scheme, the channel response matrix is transformed to its Singular Value Decomposition. The transmitter uses a unitary precoder which is derived from the matrix decomposition as follows:

$$H = UDV^H, y = UDV^H x + n, \tag{4}$$

Here, $U \in C^{r \times r}$ and $V \in C^{t \times t}$ are unitary, and $D \in \mathfrak{R}^{r \times t}$ is non-negative and diagonal. The diagonal entries of the latter matrix are the non-negative square roots of the eigenvalues of $HH^H$. Using the orthogonal transformation:

$$\tilde{y} = U^H y, \ \tilde{x} = U^H x, \ \tilde{n} = U^H n, \quad (5)$$

the channel model becomes:

$$\tilde{y} = D\tilde{x} + \tilde{n}. \quad (6)$$

where, $$E\{\tilde{n} \cdot \tilde{n}^H\} = E\{U^H n \cdot n^H U\} = U^H \Lambda U. \quad (7)$$

If $\Lambda = I$, then the transformed noise vector also has unity covariance matrix. Here onwards it is assumed that $\Lambda = I$ without loss of generality, by including a pre-whitening receiving filter matrix into the channel response matrix. Henceforth, the concatenation of the channel response matrix and the pre-whitening receiving filter matrix are referred to as the equivalent channel response.

This transformation preserves the transmit power:

$$E\{\tilde{x} \cdot \tilde{x}^H\} = E\{V^H x \cdot x^H V\} = V^H E\{x \cdot x^H\} V, \quad (8)$$

and hence $$tr(E\{\tilde{x} \cdot \tilde{x}^H\}) = tr(V^H E\{x \cdot x^H\} V) = tr(E\{x \cdot x^H\} VV^H) = tr(E\{x \cdot x^H\}). \quad (9)$$

The above orthogonal transformation decomposes the channel into independent parallel channels:

$$\tilde{y}_i = \lambda_i^{1/2} \tilde{x}_i + \tilde{n}_i, \ 1 \le i \le \min(r,t), \quad (10)$$

where $\lambda_i$ is an eigenvalue of $HH^H$.

The capacity of each such component channel is given by:

$$C_i = \log_2(1 + P_{ii} \lambda_i), \ P_{ii} = E\{|x_i|^2\}. \quad (11)$$

Figure 1:
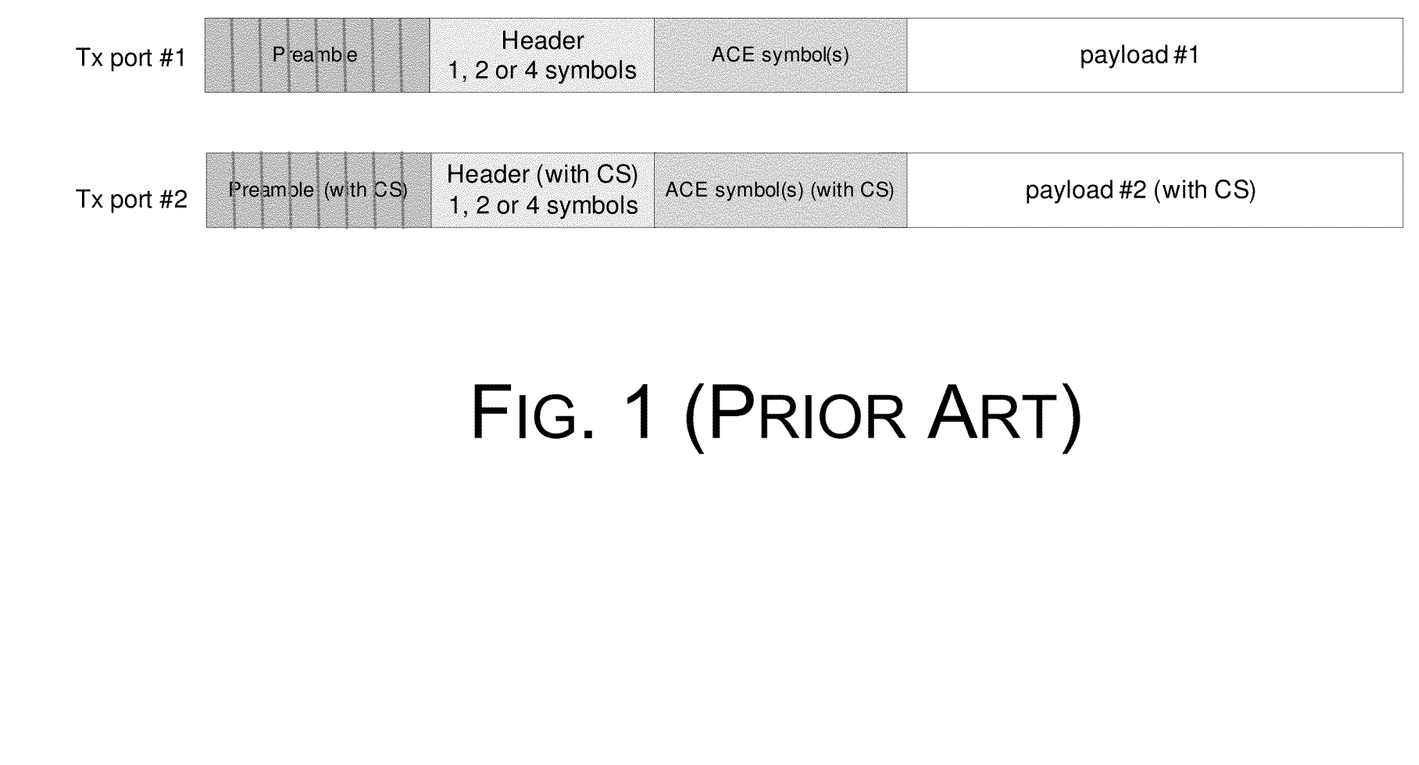
FIG. 1 illustrates format of the PHY frame in a MIMO transmission.

The format of the PHY frame in a MIMO transmission in G.hn (see G.9963) is shown in FIG. 1.

In case of MIMO transmission in G.hn, two transmit ports and two receive ports are used (i.e., t=2 and r=2). The preamble signal, as described in G.9960, is used in the MIMO scheme for G.9963, and is transmitted through the two transmit ports. The signal transmitted through the first port is the same as G.9960 and the signal transmitted through the second port is a cyclically shifted version of the signal transmitted through the first port. This approach ensures interoperability with single-input single-output (SISO) G.hn (i.e., those based on G.9960/G.9961) devices. The same transmission scheme is also used during transmission of the PHY frame header. The receiver can utilize the channel estimate of the equivalent composite channel extracted from the preamble to decode the PHY frame header.

For MIMO transmissions, a subsequent ACE symbol is used as specified in G.9963 in order to allow extraction of the individual channel responses from the composite channel responses in the receiver. During the transmission of this symbol, a known reference signal is transmitted as specified in G.9960 and G.9963. The cyclic shift used in this symbol for transmission over the second wire pair is identical to that used for preamble and PHY frame header transmission. In addition to this cyclic shift, and by contrast to even-numbered ACE symbols, odd-numbered ACE symbols (including the first ACE symbol) transmitted through the second port are also inverted with respect to the ACE symbols transmitted through the first port. An estimate of all four individual channel responses of the channel response matrix H can be derived by subtraction and addition of the two channel estimates derived from the decoded PHY frame header and the first ACE symbol. Additional ACE symbols can be used if the receiver requires additional ACE symbols to improve channel estimation. If additional ACE symbols are used, all four individual channel responses of the channel response matrix H can be derived by subtraction and addition of the channel estimates derived from even-numbered ACE symbols and odd-numbered ACE symbols.

The G.hn Recommendations (G.9960/G.9961 and G.9963) allow up to 8 ACE symbols to be added every PHY frame with payload. The first ACE symbol is mandatory in G.9963 MIMO transmissions. The complete channel response matrix H can be derived using the decoded PHY frame header and one or more ACE symbols.

The precoding matrix V maps pairs of constellation points assigned to the transmit ports on the same subcarrier to modified pairs of signals which are assigned for transmission (after OFDM modulation, i.e., IDFT) in each one of the transmit ports. Note that the precoding matrix V that is used by the transmitter may be based on compressed or uncompressed channel state information communicated by the receiver or it could be generated by the transmitter based on channel state information that it estimates. On the receive side the effective channel response is represented by matrix D as shown in equation (6). The transmitted constellation points can then be estimated by the receiver from the received vector $y = [y1, y2, \ldots, yr]^T$ by using a MIMO decoder that is based on matrix D and U.

In case of precoding, since the actual input to the channel after precoding is Vx, the equation for y in terms of x prior to precoding is as follows:

$$y = UDx + n. \quad (12)$$

Typically, the MIMO decoder is based on zero-forcing detection, since in this case more sophisticated receivers do not gain additional performance. Using a zero forcing decoder, the detection matrix for decoding x from y is as follows:

$$W = D^{-1} U^H. \quad (13)$$

In a typical receiver implementation for MIMO, the MIMO decoder is trained using the preamble, header and one or more ACE symbols. If the transmission is sent by a MIMO transmitter to a MIMO receiver, the transmitter can apply precoding to preamble, header and the ACE symbols in addition to the payload symbols. In this case the MIMO decoder that is trained using the preamble, header and ACE symbols can also be used to decode the payload. In a typical receiver implementation, the decoder W in equation (13) above can be used to decode the preamble and header. The decoded header and ACE symbols can then be used to adapt the decoder W to track the changes in the channel or other imperfections like quantization errors in the precoder. This approach works in the case where the transmit opportunity is dedicated for transmission from a MIMO transmitter to another MIMO receiver, without any requirement for other nodes to decode the PHY frame header or track the grid (e.g., contention free TXOPs, also known as CFTXOPs in G.hn).

However, in some cases, a shared transmit opportunity (STXOP) is assigned for multiple devices to transmit. All the devices that are allowed to transmit during the STXOP need to track the usage of the STXOP and need to be synchronized with the timeslots (TSs), in order to know when they are allowed to transmit. All the nodes sharing the STXOP need to decode the headers of the PHY frames transmitted during the STXOP in order to determine the duration of frame transmissions and the end of frame sequence (i.e., closing of the TS). This is called tracking of the grid of TSs. Therefore, for the reliable operation of the STXOP mechanism, the preamble and header are not allowed to be precoded, since the precoding coefficients are applicable only to the specific transmission path between the transmitter and the intended receiver of the payload. However, for the intended receiver of the payload, this leads to additional complexity and memory requirement, since the approach described earlier for the case when precoding is applied to preamble, header and ACE symbols cannot be directly used. This receiver needs to account for the fact that the preamble, header and ACE symbols are not precoded, when transforming the MIMO decoder generated using those signals for applying to the payload symbols which are precoded.

More specifically, in this case, if H is channel response matrix, then the MIMO decoder for the preamble, header and ACE symbols is the pseudo inverse of the channel response matrix as follows:

$$W=(H^H H)^{-1} H^H. \quad (14)$$

For simplicity, and without loss of generality, considering the case of square matrix H (same number of transmit and receive ports like in G.9963), the MIMO decoder can be expressed as follows:

$$W=H^{-1}=VD^{-1}U^H. \quad (15)$$

Since the precoding is applied to the payload symbols, the MIMO decoder for the payload symbols is the same as the decoder described by equation (13). Thus, in order to generate the decoder for payload symbols from the decoder used for preamble, header and ACE symbols, an additional matrix multiplication by $V^H$ is required. This requires the receiver to maintain $V^H$ for each of the links that use precoding. Alternatively, the receiver can simply ignore the decoder used for preamble, payload and ACE symbols. It can use a fixed pre-computed decoder described by equation (13).

However, the disadvantage of this approach is that there is no capability to track the changes in channel over time and adapt the decoder. This implies additional overhead in terms of frequent execution of channel estimation protocol and communication of channel state information from the receiver to the transmitter. Also, using a fixed precoder without any adaptation capability may not be very reliable in case the transmitter generates the channel state information, instead of utilizing explicit communication from the receiver.

The proposed scheme of the present disclosure adds the capability to the receivers to request precoded ACE symbols in this mode, thus reducing memory requirements and complexity in receivers. More specifically, the capability to request precoded ACE symbols is added to receivers in a mode under the g.hn MIMO standards that uses precoding to enhance the capacity of links. Using precoded ACE symbols, memory requirements for the receiver can be reduced as it is not necessary for the receiver to save the precoder coefficients. Additionally or alternatively, the frequency of updates required for the precoding coefficients can be reduced by adapting the MIMO decoder using the precoded ACE symbols as reference symbols.

In one embodiment, a mechanism is added for the receiver to request one or more ACE symbols with precoding applied by the transmitter. This would allow the receiver to generate the MIMO decoder based on the symbols which already have precoding applied and then use those for the payload symbols. This avoids the need for the receiver to maintain precoding coefficients and also avoids the operation of transforming the MIMO decoder generated using signals without precoding, so that the MIMO decoder can be applied to the payload symbols which are precoded. This can lead to substantial savings in memory and computational complexity.

For example, in case of g.hn powerline 100 Mhz bandplan, since there are up to 4096 sub-carriers where each precoding coefficient could be up to 16-bits, the savings in memory would be about 64 kbits for each link that supports precoding. Additionally, since there is no need to save the precoding coefficients on the receive side, the receiver can support multiple links with precoding with minimal memory requirement, leading to an improved throughput and more efficient use of the time on the shared medium.

Notably, the STXOP mechanism can still function as before, since at least in some embodiments of the proposed mechanism, the precoding is not applied to the preamble and PHY frame header, and it is applied to ACE symbols and payload symbols.

The techniques in accordance with the present disclosure allow a receiver to use a single block of memory allocated for a decoder to serve multiple links. Since the decoder can be generated using the precoded ACE symbols, which are sent every frame, the decoder need not be saved from frame to frame and the memory allocated to decoder is used only during the duration of the current frame. The same block of memory can then be used to serve multiple links with different transmitters that use precoding. Without such technique, one would have to allocate dedicated memory for each of the links.

Alternatively, if dedicated memory is allocated for the decoder, the precoded ACE symbols can be used to update (track) the decoder since the ACE symbols are generated from a known reference signal. This can be useful in tracking changes in the channel that are expected over time, without requiring frequent application of full channel estimation protocol.

A number of example implementations for using the MIMO decoder when the transmitter uses precoding are described here.

In a first example implementation, if the ACE symbols are not precoded, a fixed MIMO decoder with no tracking is used. This requires dedicated memory on the receiver side for the MIMO decoder on each link that uses precoding. Further, no tracking implies that the channel estimation protocol needs to be run more frequently. However dedicated memory for the precoding coefficients on the receiver side for each link that uses precoding is not required.

In a second example implementation, if the ACE symbols are not precoded, an adaptive MIMO decoder is used. In this case the MIMO decoder is generated using preamble, header and ACE symbols that are not precoded. Since the payload symbols are precoded, a transformation using the precoding coefficients is applied so that the MIMO decoder generated using the un-precoded symbols can be used for payload symbols that are precoded. This requires dedicated memory on the receiver side for the precoding coefficients for each link that uses precoding, in addition to some additional computation, so that the MIMO decoder generated using the un-precoded symbols can be used. However, dedicated memory for the MIMO decoder for each link that uses precoding is not required.

In a third example implementation, if the ACE symbols are not precoded, a fixed MIMO decoder with tracking is used. This requires dedicated memory on the receiver side for the MIMO decoder on each link that uses precoding. Moreover, dedicated memory for the precoding coefficients on the receiver side for each link that uses precoding is required for tracking (using ACE symbols). This is because the ACE symbols are un-precoded and the payload symbols are precoded.

In a fourth example implementation, if the ACE symbols are precoded, a fixed MIMO decoder with tracking is used. The precoded ACE symbols are only used to update (track) the fixed MIMO decoder. This requires dedicated memory on the receiver side for the MIMO decoder on each link that uses precoding. However, the tracking implies that the channel estimation protocol does not need to be run frequently. Furthermore, dedicated memory for the precoding coefficients on the receiver side for each link that uses precoding is not required.

In a fifth example implementation, if the ACE symbols are precoded, an adaptive MIMO decoder is used. In this case the MIMO decoder is generated using ACE symbols that are precoded. Additionally, as an option, the preamble and header can be used if they are precoded. Since the payload symbols are also precoded, a transformation using the precoding coefficients does not need to be applied to the MIMO decoder. This does not require dedicated memory for the precoding coefficients for each link that uses precoding. Furthermore, it does not require dedicated memory for MIMO decoder for each link that uses precoding. Also, no additional computation is needed for using the MIMO decoder generated using the ACE symbols.

Powerline MIMO Channel

The in-home outlets of the mains power in most countries generally include three wires: phase, neutral and protective ground. The first two are used to deliver the AC power to the appliance connected to the outlet while the protective ground is used for safety. Consequently, data transceivers over powerline may use the protective ground wiring in order to transmit and/or receive data over more than one wire pair, for example phase/neutral and neutral/ground.

Figure 2:
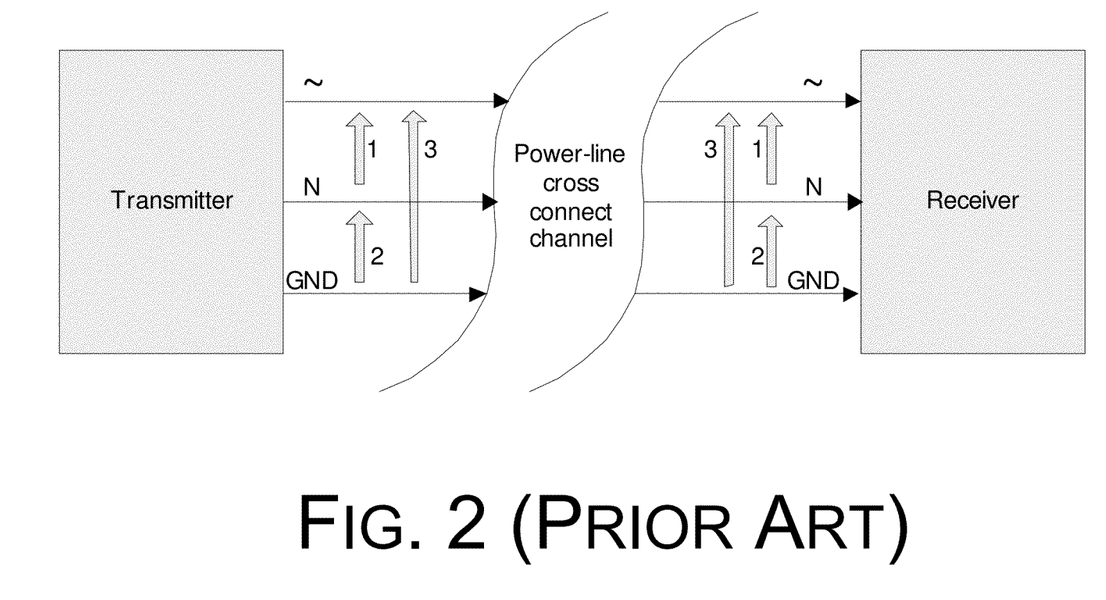
FIG. 2 illustrates an exemplary MIMO powerline channel.

According to Kirchhoff's Voltage Rule the directed sum of the electrical potential differences (voltages) around a closed loop is equal to zero. Thus, the three-wire operation allows three different differential feeding as shown in FIG. 2 but only two out of the three may be used independently. Equivalently, the received signal (superposition of the received version of the transmitted signal and noise) on the third wire-pair is also the sum (or difference) of the differential signals received on the other two ports. Thus, unless the implementation (quantization) noise is the limiting factor, only one additional reception wire-pair may be used to improve the three-wire system performance. The third wire pair on the reception end is dependent on the other two and will not exhibit any performance gain over its counterpart two wire-pair receiver. Thus, for powerlines typically 2×2 MIMO configurations and subsets thereof are used as described in G.9963.

In some cases, additional signals may be used so that the MIMO dimension exceeds 2×2. The proposed scheme of the present disclosure is also applicable to those cases.

Example Processes

Figure 3:
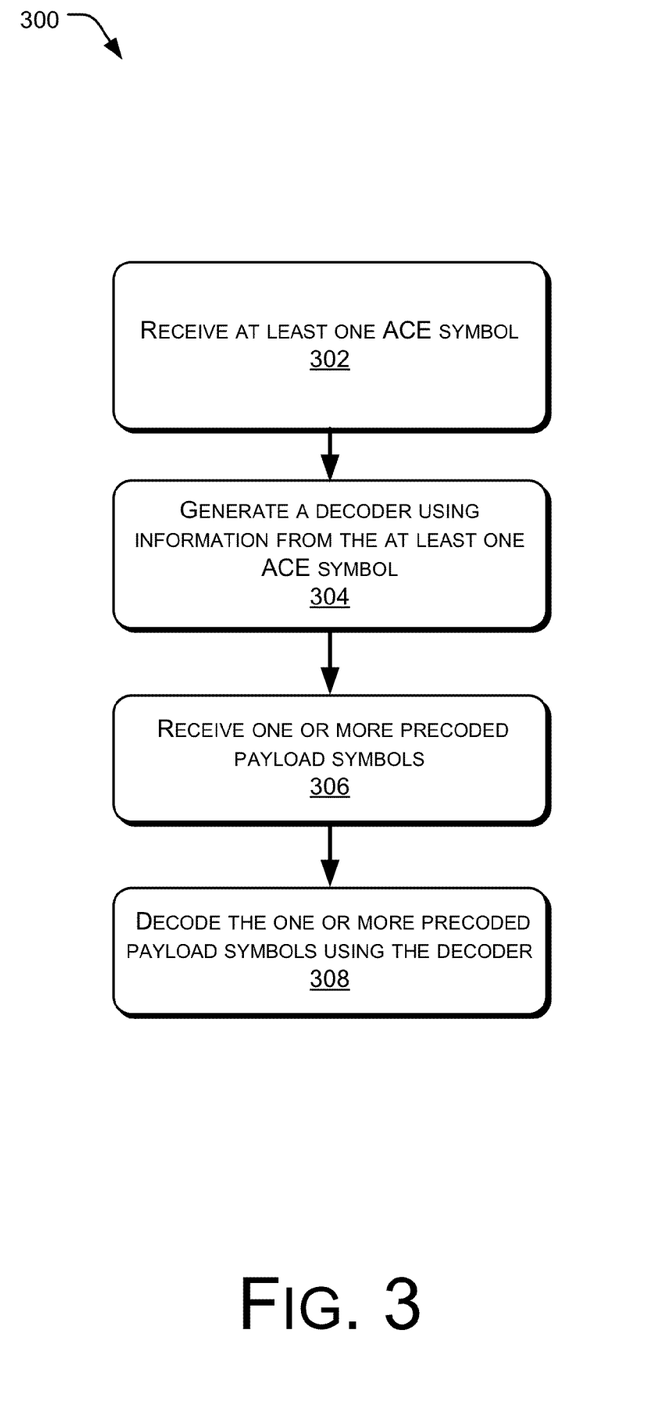
FIG. 3 illustrates a flowchart showing a process of decoding precoded symbols at a receiver in accordance with the present disclosure.

FIG. 3 illustrates a process 300 of decoding precoded symbols at a receiver in accordance with an embodiment of the present disclosure.

Example process 300 includes one or more operations, actions, or functions as illustrated by one or more of blocks 302-308. Although illustrated as discrete blocks, various blocks may be divided into additional blocks, combined into fewer blocks, or eliminated, depending on the desired implementation. Further, process 300 may be implemented by software, hardware, or a combination of software and hardware in any type of computing device, such as example processor 500 and example computing device 600 to be described below. For illustrative purposes, the operations described below are performed by a processor of a receiver or a communication device. Processing may begin at block 302.

At 302, the processor may receive at least one ACE symbol.

At 304, the processor may generate a decoder using information from the at least one ACE symbol.

At 306, the processor may receive one or more precoded payload symbols.

At 308, the processor may decode the one or more precoded payload symbols using the decoder.

In at least some embodiments, the decoder may be a MIMO decoder.

In at least some embodiments, the process 300 may further comprise transmitting a request for one or more precoded ACE symbols prior to receiving the at least one ACE symbol. The request may be a one-time request applicable to future frames until a new request is transmitted.

Alternatively, the request may be applicable to an immediate next frame and not to other future frames.

In at least some embodiments, the process 300 may further comprise: receiving a frame, the frame comprising a preamble, a header, and one or more ACE symbols that are not precoded.

In at least some embodiments, the process 300 may further comprise: receiving a frame, the frame comprising a precoded preamble, a precoded header, and one or more precoded ACE symbols; and decoding the precoded preamble, the precoded header, and the one or more precoded ACE symbols.

In at least some embodiments, the process 300 may further comprise: receiving a frame, the frame comprising a preamble that is not precoded, the frame further comprising a precoded header and one or more precoded ACE symbols; and decoding the precoded header and the one or more precoded ACE symbols. In at least some embodiments, the frame may further comprise one or more other ACE symbols that are not precoded.

In at least some embodiments, the process 300 may further comprise: receiving a frame, the frame comprising a preamble and a header that are not precoded, the frame further comprising one or more precoded ACE symbols; and decoding the one or more precoded ACE symbols. In at least some embodiments, the frame may further comprise one or more other ACE symbols that are not precoded.

Figure 4:
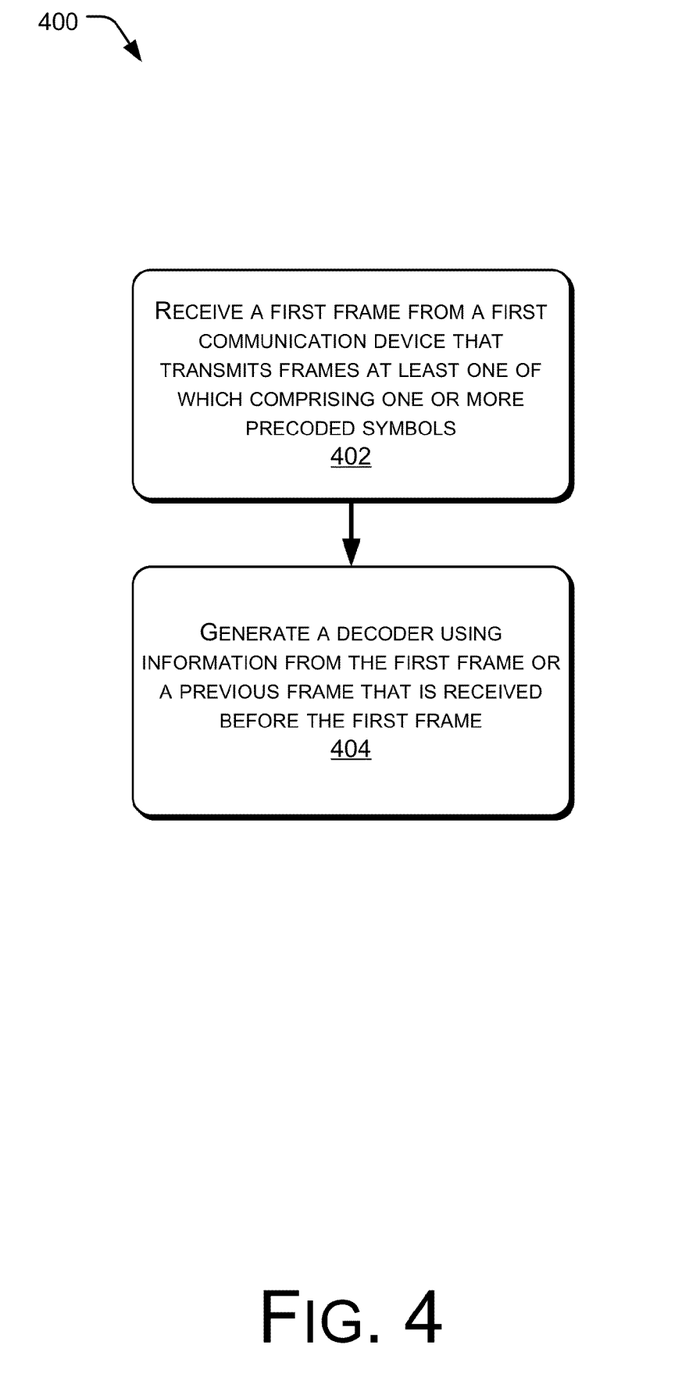
FIG. 4 illustrates a flowchart showing another process of decoding precoded symbols at a receiver in accordance with the present disclosure.

FIG. 4 illustrates a process 400 related to using a dedicated memory to store decoder coefficients for decoding precoded symbols in accordance with an embodiment of the present disclosure.

Example process 400 includes one or more operations, actions, or functions as illustrated by one or more of blocks 402-404. Although illustrated as discrete blocks, various blocks may be divided into additional blocks, combined into fewer blocks, or eliminated, depending on the desired implementation. Further, process 400 may be implemented by software, hardware, or a combination of software and hardware in any type of computing device, such as example processor 500 and example computing device 600 to be described below. For illustrative purposes, the operations described below are performed by a processor of a receiver or a communication device. Processing may begin at block 402.

At 402, the processor may receive a first frame from a first communication device that transmits a plurality of frames at least one of which comprising one or more precoded symbols. The frame may comprise at least a preamble, a header, and one or more ACE symbols.

At 404, the processor may generate a decoder using information from the first frame or a previous frame received before the first frame.

In at least some embodiments, the preamble, header, and one or more ACE symbols of the first frame may not be precoded. Under this scenario, three example implementations are described below.

Firstly, the processor may generate an adaptive MIMO decoder using the preamble, the header, and the one or more ACE symbols of the first frame.

Secondly, the processor may generate a fixed MIMO decoder using one or more ACE symbols of the previous frame.

Thirdly, in addition to generating a fixed MIMO decoder using one or more ACE symbols of the previous frame, process 400 may further comprise: receiving one or more additional frames each of which comprising one or more ACE symbols that are generated based on a reference signal; and tracking changes in a channel, through which the one or more additional frames are received, by updating the decoder.

In at least some embodiments, the one or more ACE symbols of the first frame may be precoded. Under this scenario, two example implementations are described below.

Firstly, the processor may generate an adaptive MIMO decoder using the preamble, the header, and the one or more ACE symbols of the first frame.

Secondly, the processor may generate a fixed MIMO decoder using the one or more ACE symbols of the previous frame. Additionally, process 400 may further comprise: receiving one or more additional frames each of which comprising one or more ACE symbols (which may be precoded) that are generated based on a reference signal; and tracking changes in a channel, through which the one or more additional frames are received, by updating the decoder.

Example Processor

Figure 5:
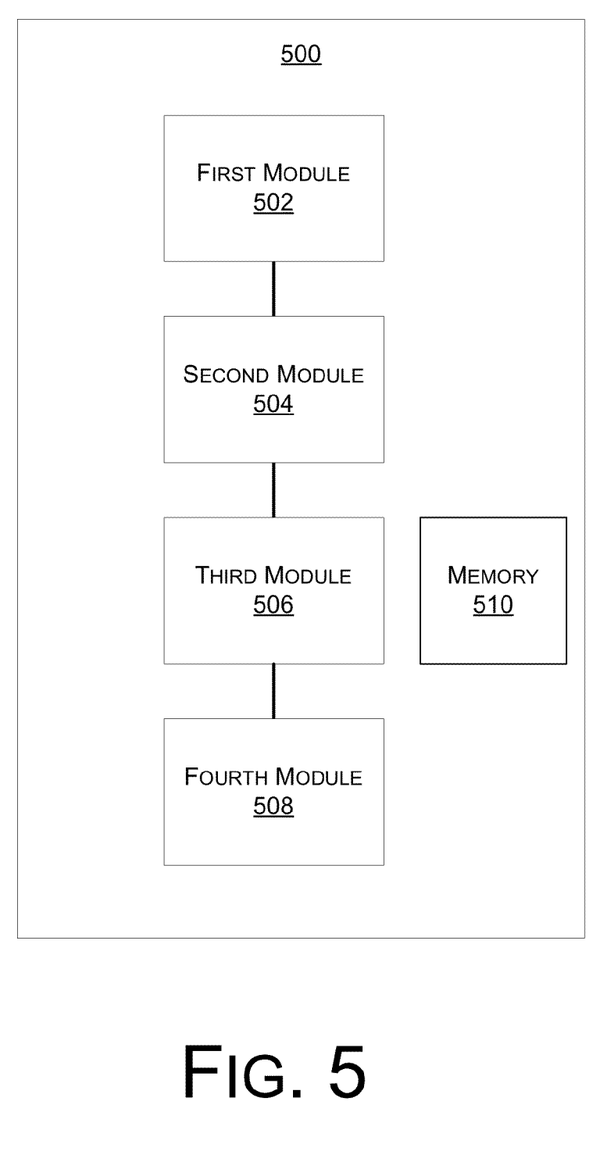
FIG. 5 illustrates a processor configured to decode precoded symbols in accordance with the present disclosure.

FIG. 5 illustrates components of a processor 500 in a receiver or a communication device that is capable of decoding precoded symbols in accordance with the present disclosure. Processor 500 may be a microprocessor, for example, and may be a processor employed in a receiver or a communication device.

As shown in FIG. 5, the processor 500 may comprise a first module 502, a second module 504, a third module 506, and a fourth module 508 which may be implemented as hardware, firmware, software or a combination thereof. That is, each of the first module 502, the second module 504, the third module 506, and the fourth module 508 may individually be implemented in the form of hardware, firmware, or software. The processor 500 may further comprise a memory 510. Moreover, as would be appreciated by those skilled in the art, although the first, second, third and fourth modules 502-508 are shown and described as separate individual modules, in various implementations some or all of the first, second, third and fourth modules 502-508 may be implemented in a single piece of hardware (e.g., an integrated circuit, a chip set, or a printed circuit board).

The first module 502 may be configured to transmit a request for one or more ACE symbols.

The second module 504 may be configured to receive at least one ACE symbol and one or more precoded payload symbols.

The third module 506 may be configured to generate a decoder using information from the at least one ACE symbol. The third module 506 may be further configured to store the decoder in a dedicated or otherwise allocated memory space of the memory 510.

The fourth module 508 may be configured to decode the one or more precoded payload symbols using the decoder.

In at least some embodiments, the decoder may be a MIMO decoder.

In at least some embodiments, the second module 504 may be further configured to receive a frame. The frame may comprise a preamble, a header, and one or more ACE symbols that are not precoded.

In at least some embodiments, the second module 504 may be further configured to receive a frame. The frame may comprise a precoded preamble, a precoded header, and one or more precoded ACE symbols. Additionally, the fourth module 508 may be further configured to decode the precoded preamble, the precoded header, and the one or more precoded ACE symbols.

In at least some embodiments, the second module 504 may be further configured to receive a frame. The frame may comprise a preamble that is not precoded. The frame may further comprise a precoded header and one or more precoded ACE symbols. Additionally, the fourth module 508 may be further configured to decode the precoded header and the one or more precoded ACE symbols.

In at least some embodiments, the second module 504 may be further configured to receive a frame. The frame may comprise a preamble and a header that are not precoded, and may further comprise one or more precoded ACE symbols. Additionally, the fourth module 508 may be further configured to decode the one or more precoded ACE symbols. In at least some embodiments, the frame may further comprise one or more other ACE symbols that are not precoded.

According to another aspect, the second module 504 may be configured to receive a first frame from a first communication device that transmits a plurality of frames at least one of which comprising one or more precoded symbols, where the frame may comprise at least a preamble, a header, and one or more ACE symbols. The third module 506 may be configured to generate a decoder using information from the first frame or a previous frame received before the first frame. The third module 506 may be further configured to store the decoder in the dedicated or otherwise allocated memory space of the memory 510.

In at least some embodiments, the preamble, header, and one or more ACE symbols of the first frame may not be precoded.

In at least some embodiments, in generating the decoder, the third module 506 may be configured to generate an adaptive MIMO decoder using the preamble, the header, and the one or more ACE symbols of the first frame.

In at least some embodiments, in generating the decoder, the third module 506 may be configured to generate a fixed MIMO decoder using one or more ACE symbols of the previous frame.

In at least some embodiments, the second module 504 may be further configured to receive one or more additional frames each of which comprising one or more ACE symbols that are generated based on a reference signal. Additionally, the fourth module 508 may be further configured to track changes in a channel, through which the one or more additional frames are received, by updating the decoder.

In at least some embodiments, the one or more ACE symbols of the first frame may be precoded.

In at least some embodiments, in generating the decoder, the third module 506 may be configured to generate an adaptive MIMO decoder using the preamble, the header, and the one or more ACE symbols of the first frame.

In at least some embodiments, in generating the decoder, the third module 506 may be configured to generate a fixed MIMO decoder using the one or more ACE symbols of the previous frame or frames. Additionally, the second module 504 may be further configured to receive one or more additional frames each of which comprising one or more ACE symbols that are generated based on a reference signal. Further, the fourth module 508 may be further configured to track changes in a channel, through which the one or more additional frames are received, by updating the MIMO decoder.

Example Computing Device

Figure 6:
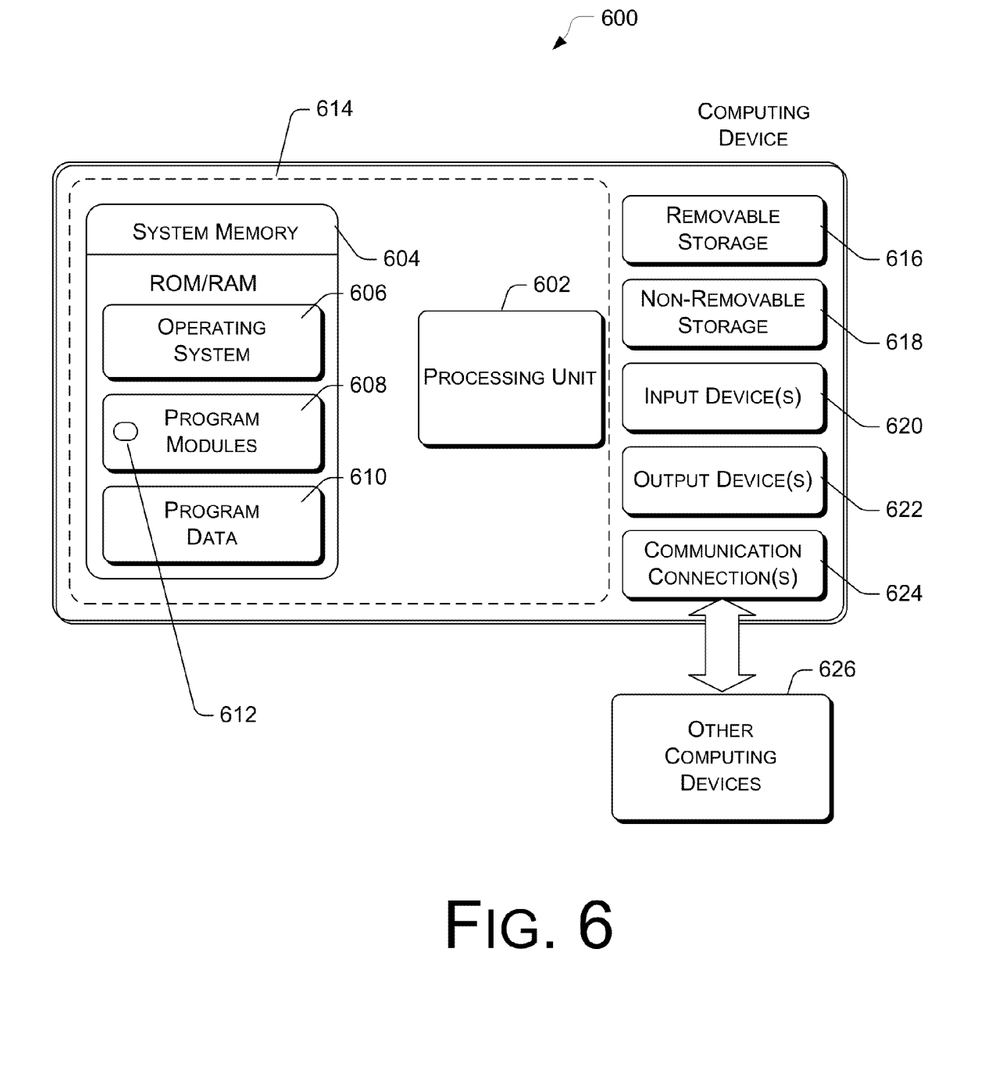
FIG. 6 illustrates a computing device configured to decode precoded symbols in accordance with the present disclosure.

FIG. 600 illustrates a representative computing device 600 that may implement the various techniques in accordance with an embodiment of the present disclosure. However, it will be readily appreciated that the techniques disclosed herein may be implemented in other computing devices, systems, and environments. The computing device 600 shown in FIG. 6 is only one example of a computing device and is not intended to suggest any limitation as to the scope of use or functionality of the computer and network architectures.

In at least one configuration, computing device 600 typically includes at least one processing unit 602 and system memory 604. Depending on the exact configuration and type of computing device, system memory 604 may be volatile (such as RAM), non-volatile (such as ROM, flash memory, etc.) or some combination thereof. System memory 604 may include an operating system 606, one or more program modules 608, and may include program data 610. The computing device 600 is of a very basic configuration demarcated by a dashed line 614. Again, a terminal may have fewer components but may interact with a computing device that may have such a basic configuration.

In one embodiment, the program module 608 includes a precoded symbols decoding module 612. The precoded symbols decoding module 612 can carry out one or more functionalities and processes as described above with reference to FIGS. 3 and 4. For example, when the precoded symbols decoding module 612 is properly configured, the computing device 600 can carry out the operations of processes 300, 400 and 500 of FIGS. 3 and 4, as well as variations thereof.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by removable storage 616 and non-removable storage 618. Computer-readable storage media may include volatile and nonvolatile, removable and non-removable media implemented in any method or technology for storage of information, such as computer-executable instructions, data structures, program modules, or other data. System memory 604, removable storage 616 and non-removable storage 618 are all examples of computer storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of the computing device 600. Computing device 600 may also have input device(s) 620 such as keyboard, mouse, pen, voice input device, touch input device, etc. Output device(s) 622 such as a display, speakers, printer, etc. may also be included.

Computing device 600 may also contain communication connections 624 that allow the device to communicate with other computing devices 626, such as over a network. These networks may include wired networks as well as wireless networks. Communication connections 624 are some examples of communication media. Communication media may typically be embodied by computer readable instructions, data structures, program modules, etc.

It is appreciated that the illustrated computing device 600 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like.

Additional and Alternative Implementation Notes

The above-described techniques pertain to decoders for decoding precoded payload symbols, when either un-precoded ACE symbols or precoded ACE symbols, or both un-precoded and precoded ACE symbols are used. Although the techniques have been described in language specific to structural features and/or methodological acts, it is to be understood that the appended claims are not necessarily limited to the specific features or acts described. Rather, the specific features and acts are disclosed as example forms of implementing such techniques. Those skilled in the art may make derivations and/or modifications of any of the disclosed embodiments or any variations thereof, and such derivations and modifications are still within the scope of the present disclosure.

In the above description of example implementations, for purposes of explanation, specific numbers, materials configurations, and other details are set forth in order to better explain the invention, as claimed. However, it will be apparent to one skilled in the art that the claimed invention may be practiced using different details than the example ones described herein. In other instances, well-known features are omitted or simplified to clarify the description of the example implementations.

The inventor intends the described embodiments to be primarily examples. The inventor does not intend these embodiments to limit the scope of the appended claims. Rather, the inventor has contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in the present disclosure, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A method comprising:
   receiving at least one precoded ACE symbol;
   generating a decoder using information from the at least one precoded ACE symbol;
   receiving one or more precoded payload symbols; and
   decoding the one or more precoded payload symbols using the decoder.

2. The method of claim 1, wherein the decoder is a multiple-input multiple-output (MIMO) decoder.

3. The method of claim 1, further comprising:
   transmitting a request for one or more precoded ACE symbols prior to receiving the at least one precoded ACE symbol.

4. The method of claim 3, wherein the request is a one-time request applicable to future frames until a new request is transmitted.

5. The method of claim 3, wherein the request is applicable to an immediate next frame and not to other future frames.

6. The method of claim 1, further comprising:
   receiving a frame, the frame comprising a preamble, a header, and one or more ACE symbols that are not precoded.

7. The method of claim 1, further comprising:
   receiving a frame, the frame comprising a precoded preamble, a precoded header, and one or more precoded ACE symbols; and
   decoding the precoded preamble, the precoded header, and the one or more precoded ACE symbols.

8. The method of claim 1, further comprising:
   receiving a frame, the frame comprising a preamble that is not precoded, the frame further comprising a precoded header and one or more precoded ACE symbols; and
   decoding the precoded header and the one or more precoded ACE symbols.

9. The method of claim 8, wherein the frame further comprises one or more other ACE symbols that are not precoded.

10. The method of claim 1, further comprising:
    receiving a frame, the frame comprising a preamble and a header that are not precoded, the frame further comprising one or more precoded ACE symbols; and
    decoding the one or more precoded ACE symbols.

11. The method of claim 10, wherein the frame further comprises one or more other ACE symbols that are not precoded.

12. A method comprising:
    receiving a first frame from a first communication device that transmits a plurality of frames at least one of which comprising one or more precoded symbols, the frame comprising at least a preamble, a header, and one or more additional channel estimation (ACE) symbols; and
    generating a decoder capable of decoding precoded payload symbols using information from the first frame or a previous frame that is received before the first frame.

13. The method of claim 12, wherein the preamble, the header, and the one or more ACE symbols of the first frame are not precoded.

14. The method of claim 13, wherein the generating the decoder comprises generating an adaptive MIMO decoder using the preamble, the header, and the one or more ACE symbols of the first frame.

15. The method of claim 13, wherein the generating the decoder comprises generating a fixed MIMO decoder using the one or more ACE symbols of the previous frame.

16. The method of claim 15, further comprising:
    receiving one or more additional frames each of which comprising one or more ACE symbols that are generated based on a reference signal; and
    tracking changes in a channel, through which the one or more additional frames are received, by updating the decoder.

17. The method of claim 12, wherein the one or more ACE symbols of the first frame are precoded.

18. The method of claim 17, wherein the generating the decoder comprises generating an adaptive MIMO decoder using the preamble, the header, and the one or more ACE symbols of the first frame.

19. The method of claim 17, wherein the generating the decoder comprises generating a fixed MIMO decoder using the one or more ACE symbols of the previous frame, and wherein the method further comprises:
    receiving one or more additional frames each of which comprising one or more ACE symbols that are generated based on a reference signal; and
    tracking changes in a channel, through which the one or more additional frames are received, by updating the decoder.

20. A processor for a communication device, comprising:
    a first module configured to transmit a request for one or more additional channel estimation (ACE) symbols;
    a second module configured to receive at least one precoded ACE symbol and one or more precoded payload symbols;
    a third module configured to generate a decoder using information from the at least one precoded ACE symbol; and
    a fourth module configured to decode the one or more precoded payload symbols using the decoder.

* * * * *